Patented July 8, 1924.

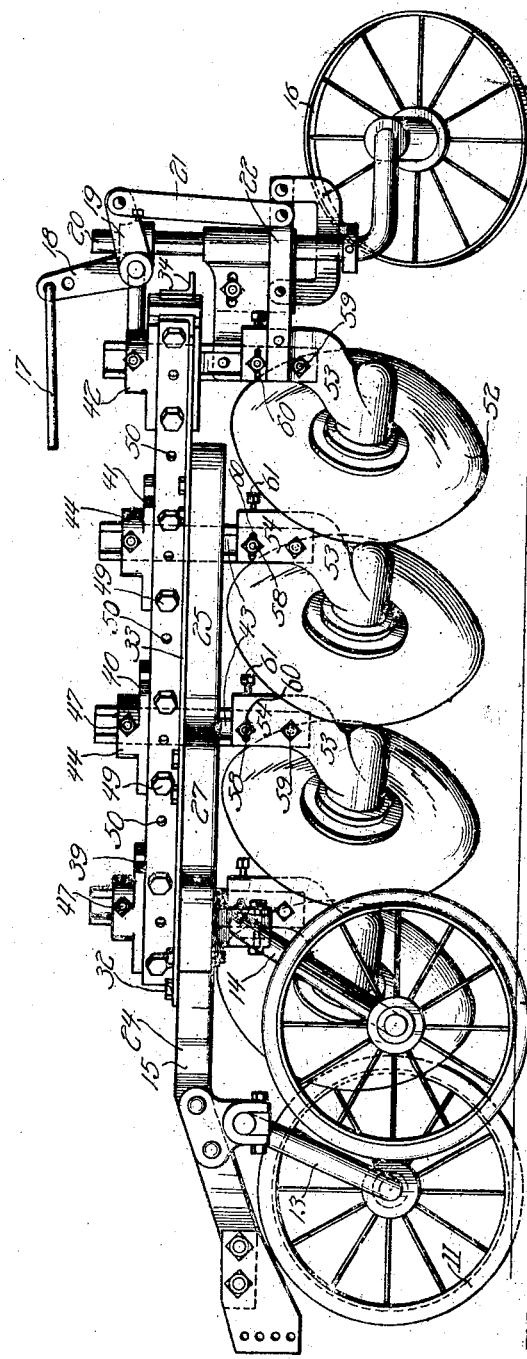

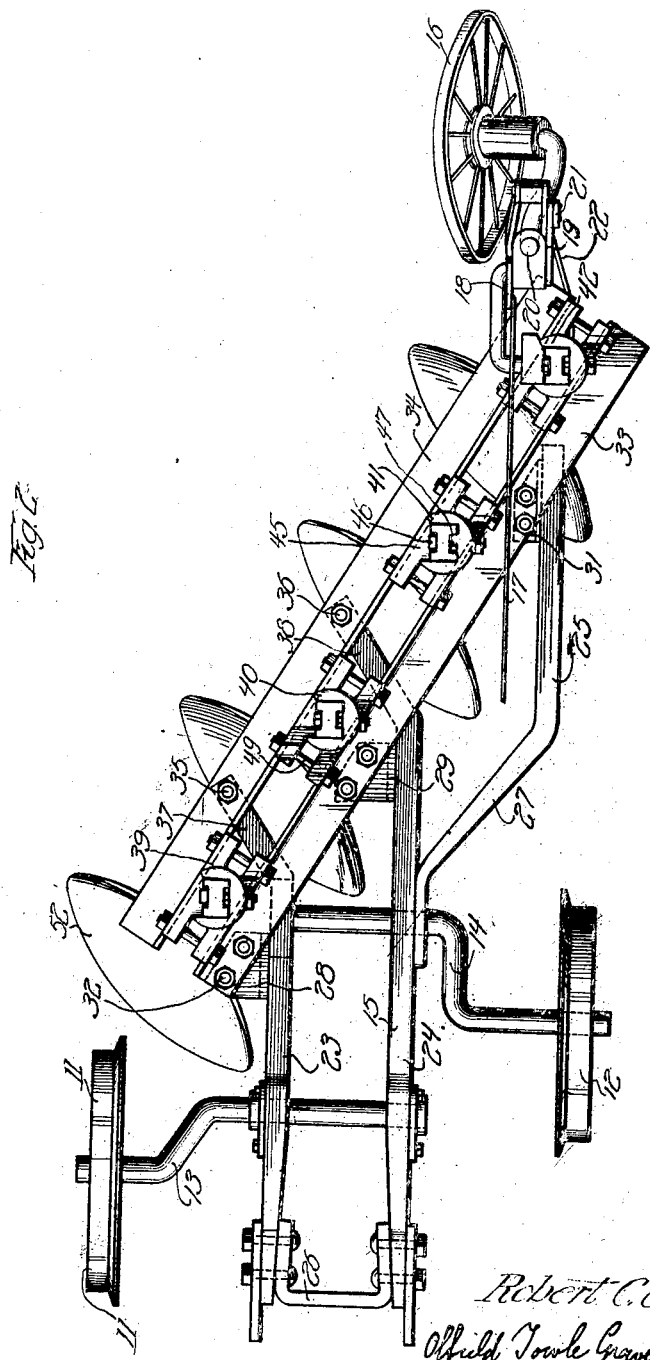

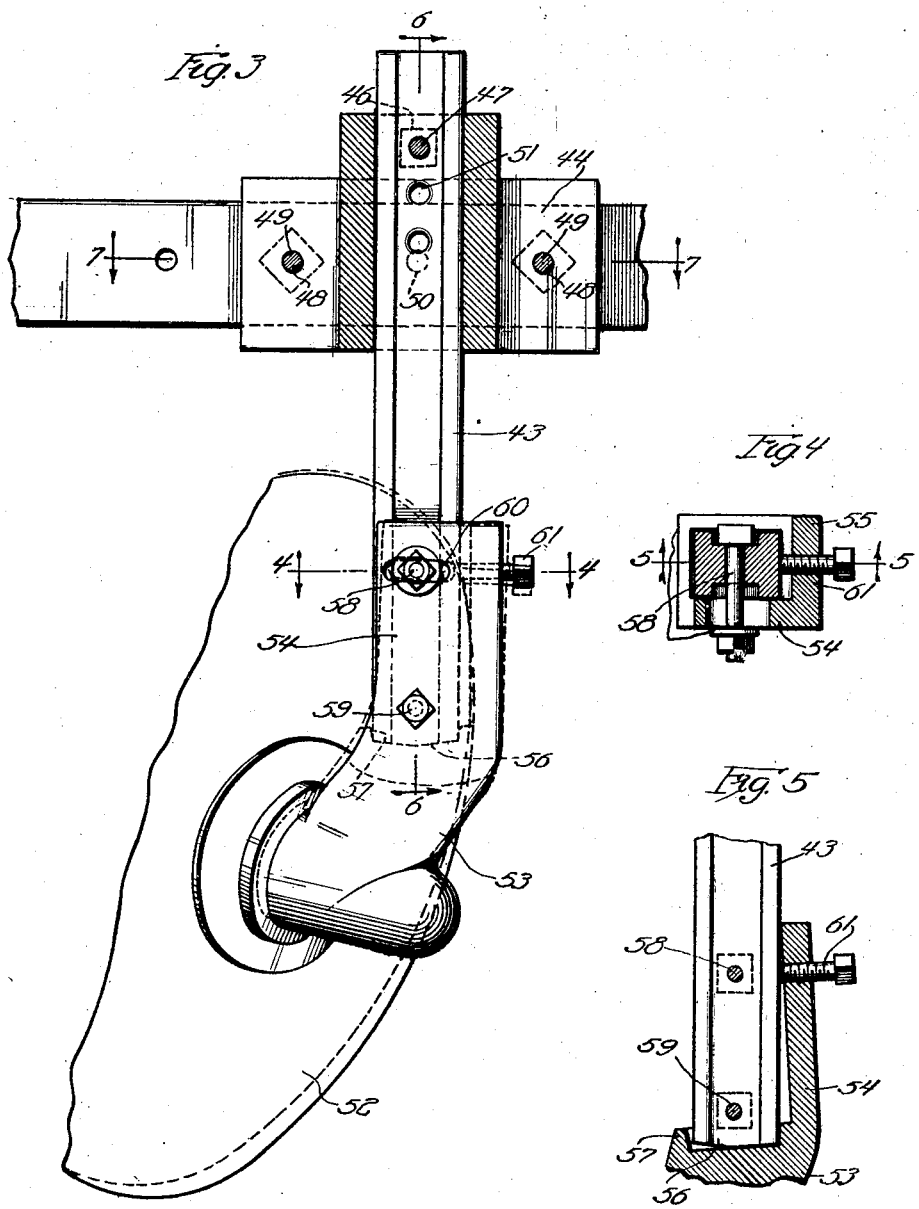

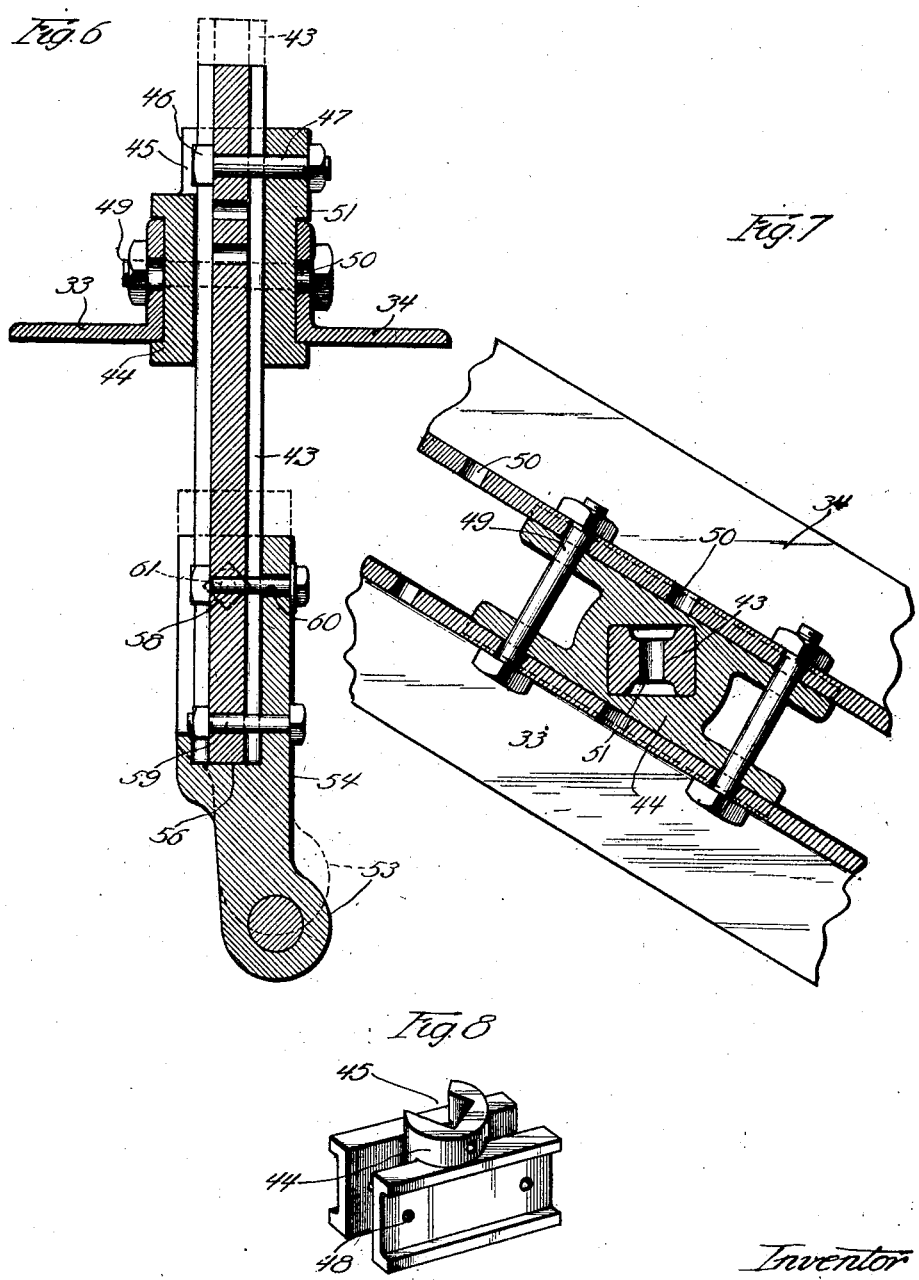

1,500,367

UNITED STATES PATENT OFFICE.

ROBERT C. CAUGHEY, OF DIXON, ILLINOIS, ASSIGNOR, BY MESNE ASSIGNMENTS, TO J. I. CASE THRESHING MACHINE COMPANY, OF RACINE, WISCONSIN, A CORPORATION OF WISCONSIN.

IMPLEMENT FRAME.

Application filed July 12, 1919. Serial No. 310,397.

*To all whom it may concern:*

Be it known that I, ROBERT C. CAUGHEY, a citizen of the United States, residing at Dixon, in the county of Lee and State of Illinois, have invented certain new and useful Improvements in Implement Frames, of which the following is a specification.

My invention relates to improvements in implement frames in general but has particular application to frames of plows of that type in which disks instead of the usual type of bottoms are employed.

The principal objects of the invention are to provide a frame of the class described in which the spacing of the earth-turning devices may be adjusted to suit the various conditions encountered in practice and also to suit the particular type or size of bottom which is employed; to provide a construction in which the bottoms or disks may be individually adjusted both as to depth and inclination; to provide an arrangement of the class described in which where a disk plow is used the weight is concentrated over the disks, thereby preventing the latter from climbing and causing the same to move in the desired path; to provide an arrangement of the class described which is of particular service in connection with power lift plows of the fixed frame type; to provide a construction which may be manufactured from materials readily procured in the open market and in general to provide a simple, efficient and inexpensive construction of the type referred to.

In the drawings, which illustrate a preferred embodiment of my invention,

Figure 1 is a side elevation of a four bottom disk plow equipped with my improvements;

Figure 2 is a plan view of the plow illustrated in Fig. 1;

Figure 3 is a vertical section through one of the beam boxes, or housings;

Figure 4 is a section taken on the line 4—4 of Fig. 3;

Figure 5 is a section taken on the line 5—5 of Fig. 4;

Figure 6 is a section taken on the line 6—6 of Fig. 3;

Figure 7 is a section taken on the line 7—7 of Fig. 3; and

Figure 8 is a perspective view of one of the boxes or castings in which the vertical stub beams are supported.

Referring to the drawings, it will be seen that the plow is of the three-wheel type in which the bottoms are fixedly mounted upon a single main frame which is capable of being elevated or lowered bodily to cause the bottoms to enter or leave the ground. The lifting mechanism may be of any desired type, although I prefer to use in connection with this invention a lifting mechanism as set forth in my application for United States Letters Patent No. 42,965, filed July 31, 1915.

In such a type of lifting mechanism the power for effecting vertical movement of the frame is secured through the rotary movement of one of the front wheels 11 and 12 of the plow, said rotary movement through suitable clutch mechanism serving to rock the arms or axles 13, 14 in the frame 15. Preferably the same power is employed to effect a similar vertical movement of the rear end of the frame with respect to the rear wheel 16, a rod 17 connecting the front power lifting mechanism with the particular mechanism by which said rear end of the plow is elevated or depressed.

Said latter mechanism in the present instance comprises a bell-crank lever 18 pivoted on a collar or block 19 rigidly secured on the upper end of the rear axle 20, the horizontal arm of said bell-crank being connected by a link 21 to the rear end 22 of the plow frame. Said rear portion 22 of the plow frame is suitably apertured to form a guide in which the vertical portion 20 of the axle may slide when the actuating rod 17 is moved to effect vertical movement of the rear end of the plow frame.

The fixed frame of the implement comprises in the present instance a set of three frame beams 23, 24 and 25. The front ends of the frame beams 23 and 24 are united together by means of a U-shaped bar 26 and extend forwardly to accommodate the usual draft rigging by which the implement is connected to the tractor. The frame beam 25 is at its front end bent obliquely as shown at 27, its front end being secured by any suitable means such as bolts or rods to the side of the frame beam 24. The frame beams 23, 24 and 25 are fitted with angle brackets 28, 29 and 31 having horizontal upper flanges to which may be secured as by bolts 32, the horizontal flange of an angle iron box frame 33. Spaced from the said box frame 33 is a complementary parallel similar box frame 34 which may be secured to the frame beams by bolts 35 and 36 passing through the bent rear ends 37 and 38 of the said frame beams 23 and 24. Preferably the apertures through which the bolts 35 and 36 pass are enlarged or slotted to permit a slight amount of movement or adjustment of the box frame 34 to or from the companion box frame 33.

The frame members 33 and 34 which extend obliquely across the center line of the disk plow serve as guides or supports for the castings 39, 40, 41 and 42 which serve as vertical guide boxes or supports for the enclosed upper ends of the vertical stub beams 43. As shown best in Figs. 6, 7 and 8, each of said castings or boxes is substantially rectangular in its general shape, its opposite vertical sides being grooved out or recessed to slidably accommodate the vertical flanges of the angle frames 33 and 34. The central portion of each of the boxes is formed in the shape of a hub or boss 44, centrally and vertically slotted or cored out to slidably accommodate the vertical stub beam. At the upper end of the boss 44 one side of the said slot is left open as shown at 45, in order to make room for the head 46 of a bolt 47 by which the stub beam may be securely clamped in the box. The ends of the boxes are drilled or cored to provide horizontally and transversely extending apertures 48 accommodating bolts 49 which extend through the upright flanges of the angle members 33 and 34. By reference to Fig. 7 it will be observed that the apertures 50 in the said vertical flanges of the angle members 33 and 34 are spaced at regular distances along the angle members so that it will be unnecessary to drill additional holes whenever it is desired to effect a change in the spacing of the beam boxes. When the spacing of the beams is to be changed it is not necessary to dismantle the plow, it being sufficient to remove the bolts 49 from the boxes which are to be moved, whereupon after the bolts 35 and 36 are slacked off the boxes may be slid along the guiding angle members 33 and 34 to the desired new location.

Referring now to the means for effecting individual adjustment of the bottoms, it will be seen that by reason of the stub beams having vertical sliding engagement with the boxes or housings 39, 40, 41 and 42, the bottoms may be depressed or lowered to suit the varying conditions, it being understood that the upper ends of the stub beams 43 are made with spaced apertures 51 to accommodate the clamping bolts 47 at various heights of the stub beams.

The bottom itself may also be adjusted with respect to its inclination to the stub beams 43. In the present instance each bottom consists of a disk 52 mounted to rotate on a suitable axle carried in the lower end of a cast socket 53. Said socket 53 is formed with a pair of upstanding angularly disposed flanges 54 and 55, as shown clearly in Fig. 4. The vertical stub beams 43 has its end rounded slightly, as shown at 56 in Fig. 5, to rock in a recess or depression founded by a lip 57 extending around the outer sides of the said recess. The lower end of the plow beam is also equipped with a pair of clamping bolts 58 and 59 by which the said bottom may be clamped to the longitudinally extending flange 54 of the socket. The upper bolt 58 extends through a slot 60 in the upper end of the flange 54 whereby the socket may be rocked round a horizontal axis coincident with the axis of the clamping bolt 59. In order to hold the socket in the desired inclined position without relying wholly upon the frictional clamping effect of the clamping bolt 58, I prefer to employ a substantial set-screw 61 threaded into the other vertical flange 55 of the socket and bearing against the rear face of the stub plow beam 43 just behind the clamping bolt 58.

It will be apparent from the above description of the parts that the construction secures in an efficient manner the stated objects of the invention in addition to which other advantages will be readily apparent to those skilled in the art.

The scope of the invention is not intended to be limited by the detailed description of the parts but should be determined by reference to the appended claims, the latter being construed as broadly as possible consistent with the state of the art.

I claim as my invention:

1. In an agricultural implement, the combination of a frame having a pair of upright flanges mounted transversely thereon, a plurality of socket members interposed between the flanges and adjustable therebetween at optionally spaced intervals, means for adjusting one of the flanges toward the other so as to closely confine the socket members therebetween, stub beams vertically adjustable in the socket members and earth turning bodies secured to the lower ends of the stub beams.

2. In an agricultural implement, the combination of a frame having an upright flange secured diagonally thereon, a companion flange parallel with and adjustable to and from the first-mentioned flange, a plurality of socket members interposed between the flanges and adapted to be spaced apart and secured to the flanges at optional intervals, means for securing the adjustable flange onto the frame in the adjusted position, stub beams engaging upright openings in the socket members and adapted to be selectively secured therein at different positions of vertical adjustment and earth turning bodies secured to the lower ends of the stub beams.

3. In an agricultural implement, the combination of a frame, a pair of spaced angle irons having horizontal flanges secured to the frame and vertical flanges in parallel spaced relation, a plurality of socket members interposed between the vertical flanges of the angle irons and having bolt holes adapted to register with bolt holes in the vertical flanges to receive bolts for clamping the angle irons and socket members together with the latter adjusted at optionally spaced intervals, means for adjusting one of the angle irons on the frame relatively to the other angle iron for clamping the socket members between the vertical flanges of the angle irons and earth turning bodies having upright supporting beams vertically adjustable in the socket members.

4. In an agricultural implement, the combination of a frame, a series of adjustable spaced depending supports on the frame arranged diagonally to the line of draft, each independently adjustable to various elevations, an earth-turning body pivoted on the lower end of each support on an axis at right angles to the line of draft, and means for adjusting the pivotal connection and locking the earth-turning body in the adjusted position.

5. In an agricultural implement, the combination of a frame, a diagonal guideway on the frame, a plurality of supporting members adjustably mounted on the guideway so as to be positioned at optional spaced intervals, stub beams carried by and adapted for elevational adjustment in the supporting members, a bracket pivoted at the lower end of the stub beam and having an earth turning body rotatably mounted thereon and means for pivotally adjusting and clamping the bracket on the stub beam.

ROBERT C. CAUGHEY.